Oct. 6, 1953

R. M. REED 2,654,657

TUBULAR REACTOR WITH EXPANSION COMPENSATOR

Filed Aug. 14, 1950

INVENTOR
Robert M. Reed
BY
ATTORNEYS

Oct. 6, 1953
R. M. REED
2,654,657
TUBULAR REACTOR WITH EXPANSION COMPENSATOR
Filed Aug. 14, 1950
2 Sheets-Sheet 2
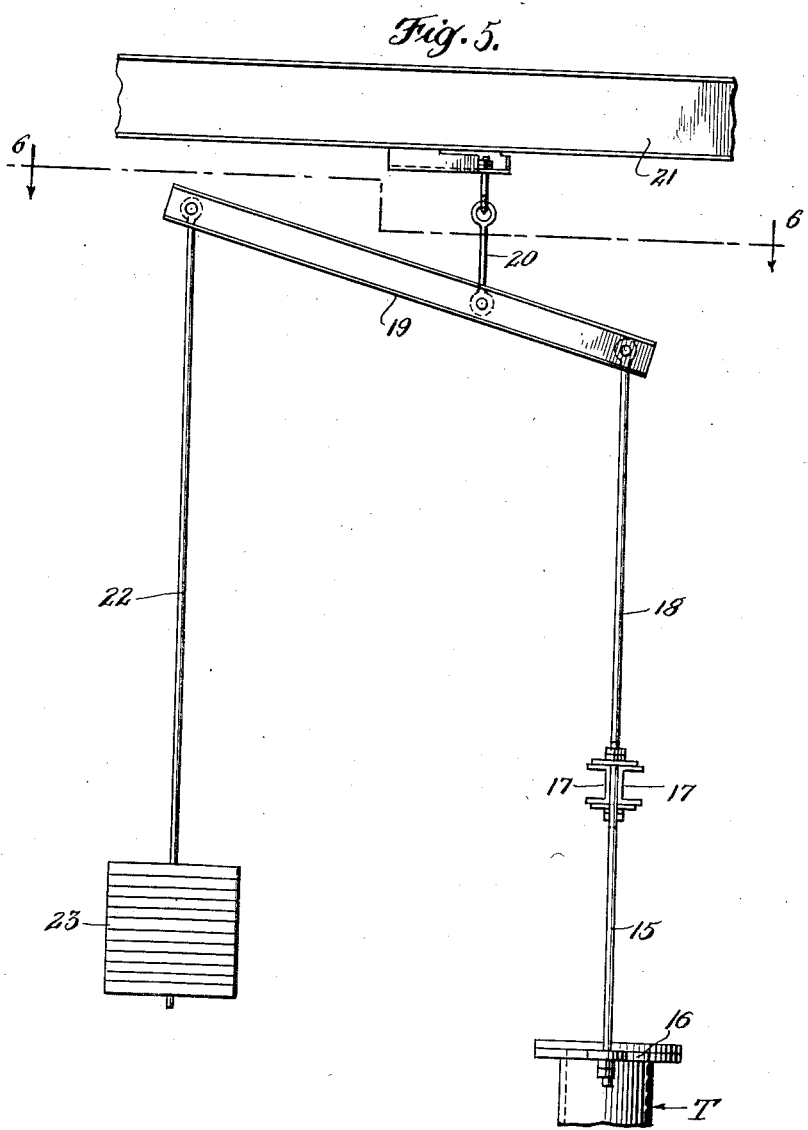
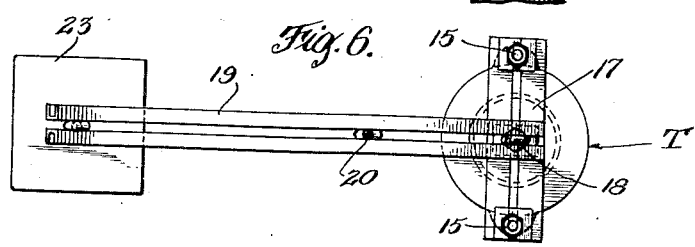
INVENTOR
Robert M. Reed
BY
ATTORNEYS Patented Oct. 6, 1953

2,654,657

UNITED STATES PATENT OFFICE 2,654,657

TUBULAR REACTOR WITH EXPANSION COMPENSATOR

Robert M. Reed, Louisville, Ky., assignor, by mesne assignments, to National Cylinder Gas Company, Chicago, Ill., a corporation of Delaware Application August 14, 1950, Serial No. 179,360

1 Claim. (Cl. 23—277)

This invention relates to gas producing apparatus and is particularly concerned with an improved furnace for the production of gaseous mixtures of hydrogen and carbon oxides.

Furnaces of various types for this general purpose are known. One common type of furnace comprises a heating or combustion chamber and a furnace tube vertically disposed in the combustion chamber. The furnace tube is ordinarily packed with a catalytic material. The process gases are introduced into one end of the tube, and after passing in contact with the catalytic material therein, are removed from the other end of the tube. Furnaces of this type have been employed generally in carrying out endothermic reactions such as, for example, those which take place during the catalytic conversion of mixtures of hydrocarbon and oxygen-containing gases into mixtures of hydrogen and carbon oxides. Such reactions ordinarily are accomplished at relatively high temperatures, and substantial amounts of heat must be supplied to the gases passing through the furnace tube in order to raise the entering gases to the desired reaction temperature and to maintain the gases at that temperature during the reaction. Since appreciable time is required for the gases to reach reaction temperature and further time is required to carry the reaction to the desired degree of completion, the furnace tubes ordinarily are of considerable length, sometimes as long as 30 feet or more.

The present invention is concerned with apparatus of the kind referred to above, and the general object of the invention is to improve the arrangement, structure and operation of furnaces of this type.

In considering some of the objects and advantages more specifically, it is noted that because of the great vertical height of the furnace tube, the matter of making connections to the ends of the tube represents a substantial problem. In most furnaces of this kind piping connections are made to both ends of the furnace tube. For this and other reasons, it has been customary to provide for ready access to the proper end of the furnace and furnace tube, as for example by the building of platforms, stairways, etc.

According to the present invention, the necessity for access to the upper end of the furnace and of the furnace tube is greatly diminished by special features of arrangement in the furnace and furnace tube structure, according to which the gas inlet as well as the gas outlet from the furnace tube structure are both arranged at the lower end thereof. In addition the offtake for combustion gases from the heating or combustion chamber surrounding the furnace tube is also located toward the lower end thereof, which is of advantage from the standpoint of laying out and making plant installations, since the combustion gas offtake represents a convenient source of heat which may be utilized for various purposes in the overall scheme of the plant, including, for example, the preheating of gases to be introduced into the furnace tube. With the combustion gas offtake located at the lower end of the combustion chamber the device or devices adapted to utilize the waste heat of the products of combustion are conveniently located close to the ground level and therefore also close to the region where piping connections are made for delivering a preheated reactant gas to the lower end of the furnace tube.

While it is not intended to indicate that access to the upper end of the furnace is never required, nevertheless it is of advantage that, according to the invention, the necessity for such access is greatly diminished, as will readily be understood by those skilled in the art.

Before considering certain other objects and advantages of the invention, it is here pointed out that in the furnace tube construction of the invention, a return tube arranged concentrically within a main tube serves to define, with the main tube, an annular chamber within the furnace tube for the reception of the catalyst. The upper ends of the main tube and of the return tube are in communication with each other, and the lower end of the return tube is provided with an outlet connection extending through the wall of the main tube. It is in this way that applicant has brought both the inlet and the outlet to the lower end of the furnace tube structure considered as a whole.

The foregoing arrangement has special advantages per se, including the fact that the hot reacted gases flowing downwardly through the return tube serve to transfer heat to the incoming gases in the lower region of the main tube. Furthermore, as compared with previously known furnaces of this kind, the arrangement of the catalyst bed in the annular space of the furnace tube affords a substantial decrease in the distance which the heat must travel from the heated tube walls to the portions of the catalyst most remote from the tube walls. As a result, a more uniform temperature and rate of reaction throughout any cross-section of the catalyst mass are realized.

Still another object of the invention is to eliminate the necessity for using flexible joints or connections in the piping for delivering gases to, and discharging gases from the furnace tube. It has been customary in this art to suspend such a tube from its upper end, so that expansion and contraction of the tube result in raising and lowering of the lower end of the tube. This has necessitated use of flexible connections in any piping associated with the lower end of the tube. This objectionable feature of prior arrangements has been eliminated according to the present invention by mounting the tube in the furnace in such manner as to accommodate expansion and contraction at the upper end rather than at the lower end of the tube.

Other objects and advantages will appear more fully from the following description referring to the accompanying drawings, in which—

Figure 5 is an elevational view (taken in a line at right angles to the plane in Figure 1) of the suspension mechanism for the tube which is arranged at the upper end thereof; and Figure 6 is a view taken as indicated by the line 6—6 on Figure 5.

In considering the drawings it is first pointed out that in the embodiment of the invention illustrated only a single furnace tube has been shown in the combusion chamber. It will be understood that furnaces having two or more tubes may also be constructed according to the present invention. However, the illustration and description of a furnace incorporating a single tube is sufficient for purposes of explanation.

The combustion chamber of the furnace is built up of refractories, the vertical refractory walls being indicated at 7. Refractories serving respectively as the arch and hearth of the furnace are also provided at the upper and lower ends of the combustion chamber as indicated at 8 and 9. Both the arch and hearth are apertured to accommodate the tube structure, which latter is generally indicated by the letter T in Figures 1, 2, 5 and 6. Appropriate packing may be provided around the furnace tube where it passes through the arch and hearth. Packing gland 10 permits movement of the tube relative to the arch of the furnace during expansion and contraction of the tube and at the same time prevents appreciable heat loss around the tube. The combustion chamber is provided with a number of burners, for instance gas burners such as indicated at 11. Inspection doors are provided at appropriate points, as indicated at 12.

Figure 1:
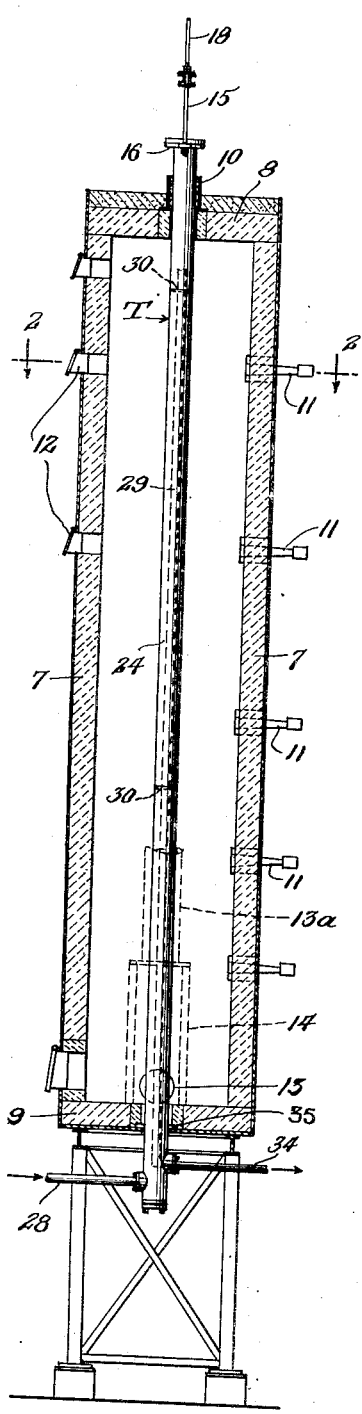
Figure 1 is a vertical sectional view through a furnace incorporating the features of the invention.
Figure 2:
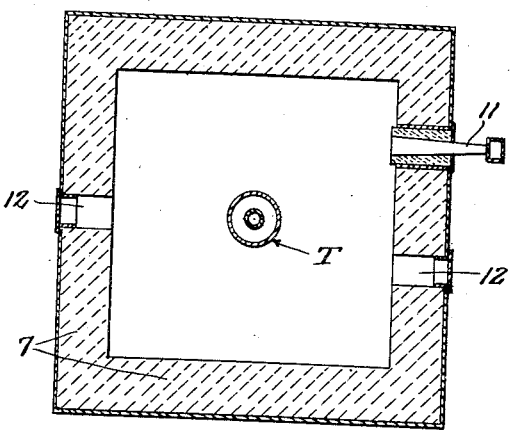
Figure 2 is a horizontal sectional view taken as indicated by the section line 2—2 on Figure 1, Figure 2 being on an enlarged scale.

As seen in Figure 1 the offtake for the products of combustion is arranged at the bottom end of the combustion chamber, this offtake being shown in Figure 1 at 13. The offtake may deliver to a chamber 14 adapted for example to receive heater coils, the gases being discharged from the chamber 14 through a stack such as indicated at 13a. The stack structure preferably extends upwardly to a substantial height, advantageously somewhat higher than the furnace, to provide draft. Draft fans may, of course, be utilized.

The manner of mounting the furnace tube T within the furnace can best be understood from examination of Figures 1, 5 and 6. Here it will be seen that suspension rods 15 are connected with the upper end closure 16 of the furnace tube. The rods 15 are connected to a transverse structure 17 which in turn is suspended by a rod 18 which extends upwardly for connection with one end of lever 19. This lever is pivotally suspended intermediate its ends as by the link 20 hanging from the overhead supporting structure 21. A rod 22 hangs from the opposite end of the lever 19 and this rod serves to carry counterweights 23.

Lugs 35 welded to the main tube are secured, as by welding or by means of bolts, to the furnace framework at the bottom of the furnace to provide rigid support for the tube. Substantially all of the expansion and contraction of the furnace tube takes place within the combustion space of the furnace while the changes in temperature and dimensions of the tube below the hearth of the furnace are relatively small. Therefore, by rigidly securing the tube at the bottom of the furnace, the use of fixed connections rather than flexible connections at the lower end of the tube are made possible.

In the preferred arrangement the weight of the counterweights and the leverage provided by the lever 19 are such as to provide an upward pull equal to a major portion of the weight of the furnace tube. While this upward pull may be provided by springs, the counterweight arrangement illustrated is preferred and the upward pull provided thereby aids the upward expansion of the furnace tube and also prevents any possibility of the tube buckling because of compression strains at the high operating temperatures within the combustion space of the furnace.

Figure 3:
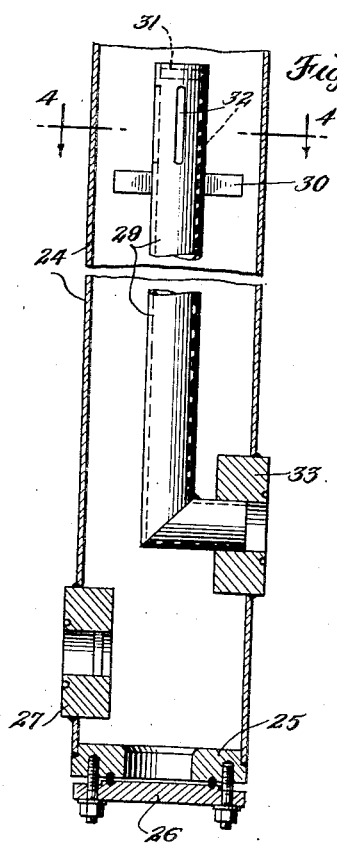
Figure 3 is a still further enlarged vertical sectional view through the upper and lower end portions of the furnace tube of the invention.
Figure 4:
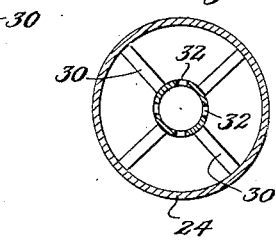
Figure 4 is a horizontal sectional view taken as indicated by the section line 4—4 on Figure 3.

Turning now to the structure of the furnace tube itself, especially as illustrated in Figures 3 and 4, it is first noted that this structure comprises the furnace tube proper 24 which may be, for example, 8 or 9 inches in diameter and up to as much as 30 or 40 feet long. In a typical installation this tube may be formed of alloy steel, such as type 310 stainless steel. This tube is closed at its upper end (see Figures 1 and 5) by a plain cover plate 16. At its lower end (Figure 2) the tube is provided with a centrally apertured plug 25 under which a removable cover plate 26 is arranged, for a purpose to be described hereinafter.

While the gas inlet may be arranged in the bottom end of the furnace tube, it is preferred to locate the inlet in the side wall of the tube near the lower end thereof as indicated at 27 in Figure 3, this fitting serving for convenient attachment of the supply pipe 28 for the gases to be reacted, as appears in Figure 1.

A return tube 29 is arranged concentrically within the furnace tube 24, being extended throughout the major portion of the height of the furnace tube and being spaced and mounted therein by means of lugs or equivalent supports such as shown at 30. This return tube is also desirably made of alloy steel, such as type 310 stainless steel. As shown in Figure 3, the upper end of the return tube 29 is plugged as indicated at 31 and just below this plug the side wall of the return tube is slotted as at 32, these slots serving as a means of intercommunication between the upper ends of the two tubes, so that the reacted gases will enter the upper end of the return tube to flow downwardly therethrough for discharge. The lower or discharge end of the return tube may be brought out through the bottom of the furnace tube. However, most advantageously the discharge end of the return tube is connected with a fitting 33 in the side wall of the furnace tube 24 near the bottom to provide for discharge of the reacted gases exteriorly of the furnace tube. This fitting 33 is adapted to cooperate with the piping shown for example at 34 in Figure 1.

Because of the suspension of the tube to provide for expansion and contraction thereof at the upper end, the inlet and discharge piping 28 and 34 need not incorporate flexible connections, as has already been pointed out.

In considering the operation of the equipment above described and also certain advantages of the equipment, it is assumed that the installation is to be used for the production of gaseous mixtures of hydrogen and carbon oxides. For this purpose a mixture of gases is introduced through the supply connection 28, such mixture including for example a hydrocarbon gas, for instance methane, together with a suitable oxygen-containing gas such as, for example, air, steam and carbon dioxide, or mixtures thereof. By known reactions occurring at elevated temperatures, for instance between about 1200° F. and 2000° F., in the presence of a catalyst such as a nickel-containing catalyst, substantial quantities of hydrogen and carbon oxides are produced and the gases resulting from the reaction are discharged from the equipment through the return tube and out of the discharge pipe 34. For the purpose mentioned just above, the annular chamber within the furnace tube, surrounding the return tube is charged with catalytic material, for instance a nickel-containing catalytic material in lump or pellet form. A refractory preheat material, also in lump or pellet form is desirably packed into the lower end of the annular space in the furnace tube, the catalytic material being charged on top of the refractory preheat material. In a typical case, the refractory preheat material may occupy the lower one-fourth or one-third of the annular space. The refractory material and the catalytic material may both be introduced into the tube through the upper end thereof, by removal of the upper cover plate. From time to time the refractory and catalytic material require replacement and the structural arrangements near and at the lower end of the tube are of convenience and advantage when it is desired to replace the refractory and catalytic materials. Thus, as seen in Figure 3, for the purpose of removing these materials, the lower closure plate 26 may be taken off and the refractory and catalytic material discharged through the aperture in the plug 25. Although the aperture for removing he catalytic material may be located in the side of the furnace tube at the bottom thereof, the arrangement as shown with the aperture in the bottom and with both the gas inlet and the gas outlet (27 and 33) in the side wall of the furnace tube facilitates the removal of the refractory and catalytic materials.

As above mentioned the furnace structure of the present invention is of advantage for a number of reasons, among which may be mentioned the location of both the inlet and the outlet for the gases at the lower end of the furnace tube which is convenient from the standpoint of providing connection to the source of supply of the gases to be reacted and also of handling the discharged gases, which latter ordinarily are delivered to other equipment advantageously located at or near ground level, for instance equipment for further treating the product gases. The downward flow of the product gases through the return pipe is utilized as a means for transferring heat to the incoming gases in the lower region of the furnace tube. The combustion gas offtake 13 which is also located at the lower end of the furnace enables convenient use of the waste heat for other purposes related to the overall operation, such for example as the production of steam to be introduced as one component of the mixed gases supplied to the furnace tube.

Because of the location of the gas inlet, the gas outlet and the combustion chamber offtake at the lower end of the furnace, the necessity for access to the upper end is greatly diminished.

Because of the location of the gas inlet and the gas discharge at the lower end of the furnace tube, it becomes practical to support the tube rigidly near its lower end which permits free movement of the tube above the point of rigid support and completely eliminates the necessity of employing flexible connections in any of the piping associated with the furnace tube.

I claim:

A furnace for use in reacting gases, comprising a vertically elongated combustion chamber, a vertically elongated furnace tube structure extended through said chamber and projecting above and below the chamber and having gas inlet and gas outlet connections rigidly connected therewith toward the lower end thereof below the combustion chamber, and supporting mechanism for the furnace tube including a fixed support cooperating with the furnace tube adjacent the lower end thereof and adjacent said inlet and outlet connections and providing for support of the lower end of the furnace tube in a fixed vertical position, the furnace tube being free to expand upwardly through the top of the combustion chamber, and vertically movable supporting means cooperating with the furnace tube adjacent the upper end thereof and imposing a lifting force on said upper end, said fixed support and said supporting means each providing support for a portion of the total weight of the furnace tube and cooperating to accommodate expansion and contraction of the tube at the upper end of the tube structure.

ROBERT M. REED.

References Cited in the file of this patent

UNITED STATES PATENTS

| Number | Name | Date |
|---|---|---|
| 1,428,323 | Colvin | Sept. 5, 1922 |
| 1,892,862 | Wilcox | Jan. 3, 1933 |
| 2,028,326 | Hanks et al. | Jan. 21, 1936 |

FOREIGN PATENTS

| Number | Country | Date |
|---|---|---|
| 330,872 | Great Britain | June 19, 1930 |
| 703,351 | France | Apr. 29, 1931 |
| 531,946 | Germany | Apr. 25, 1928 |